United States Patent
Mueller et al.

(10) Patent No.: US 7,245,590 B2
(45) Date of Patent: Jul. 17, 2007

(54) METHOD FOR FLOW CONTROL FOR A NUMBER OF TRANSMITTERS WITH AN UNKNOWN AND/OR DIFFERENT TRANSMISSION POWER

(75) Inventors: Erasmus Mueller, Meinerzhagen (DE); Michael Tuexen, Munich (DE); Christopher Ross, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1065 days.

(21) Appl. No.: 10/138,969

(22) Filed: May 2, 2002

(65) Prior Publication Data

US 2002/0181467 A1 Dec. 5, 2002

(30) Foreign Application Priority Data

May 4, 2001 (EP) ................................. 01110856

(51) Int. Cl.
*H04B 1/44* (2006.01)
(52) U.S. Cl. ..................... 370/282; 370/232; 370/465
(58) Field of Classification Search ................ 370/394, 370/278, 282, 252, 229–235, 465; 709/239, 709/223
See application file for complete search history.

(56) References Cited

U.S. PATENT DOCUMENTS 5,931,916 A * 8/1999 Barker et al. ............... 709/239
6,141,324 A 10/2000 Abbott et al.
6,937,600 B2 * 8/2005 Takagi ......................... 370/394
2002/0163933 A1 * 11/2002 Benveniste ................. 370/465

FOREIGN PATENT DOCUMENTS

EP 0 374 928 6/1990

* cited by examiner

*Primary Examiner*—John Pezzlo
(74) *Attorney, Agent, or Firm*—Bell, Boyd & Lloyd LLP

(57) ABSTRACT

A node to which message channels are connected is considered in a communication network. Traffic sources and traffic sinks are connected to the other end of these message channels. The transmission power of the traffic sources is unknown, and the traffic sources are not all always active. A number of message channels may be connected to one node. A protocol which has a window mechanism for controlling the number of messages which a traffic source may send without acknowledgement is used for reliable message transmission. In the event of reception overload, messages may be rejected in such a node. The present invention controls the window size on the basis of the number of received messages, and not at fixed time intervals. No measurements are carried out for inactive message channels, which are thus not associated with any computation capacity. Message channels which always completely fill their windows are controlled more frequency than message channels which do not completely fill their windows. This results in the window size of those message channels which always completely use their windows being continuously increased further during operation without overload, on the one hand, in order to take account of their transmission power. On the other hand, these message channels likewise are controlled more frequently in the event of overload, so that the node is more effectively protected against being overloaded.

13 Claims, 1 Drawing Sheet

Flowchart relating to the exemplary embodiment

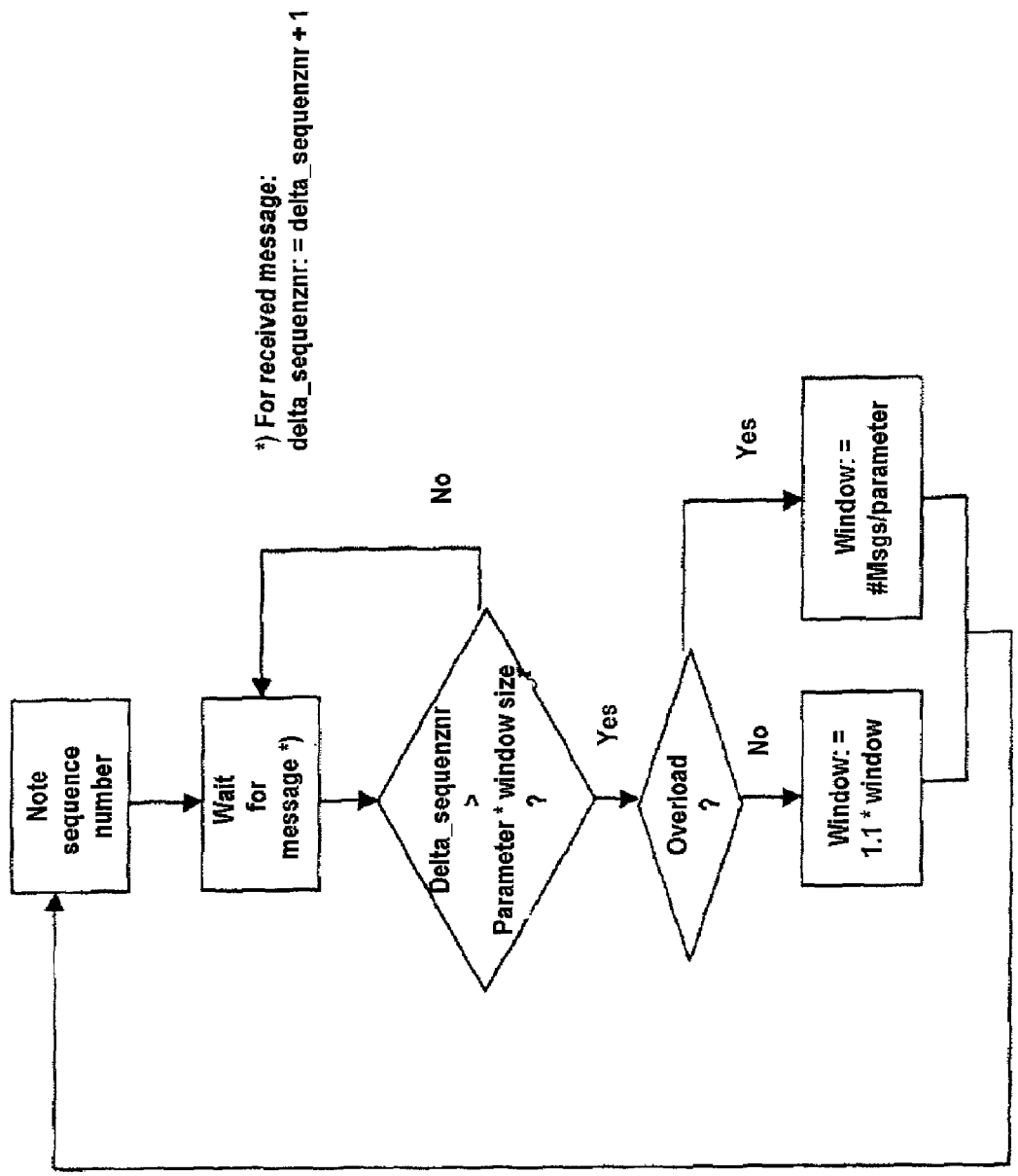

METHOD FOR FLOW CONTROL FOR A NUMBER OF TRANSMITTERS WITH AN UNKNOWN AND/OR DIFFERENT TRANSMISSION POWER

BACKGROUND OF THE INVENTION

A node to which bidirectional message channels are connected for transmitting and receiving is considered in a communication network. Traffic sources and traffic sinks are connected to the other end of these message channels. The transmission power of the traffic sources is unknown, and the traffic sources are not all always active. A number of message channels may be connected to one node. A protocol which has a window mechanism for controlling the number of messages which a traffic source may send without acknowledgement is used for reliable message transmission.

A reception overload can occur in a node such as this if the messages arriving on the message channels exceed the capacity of the receiving device for that node. In this case, messages are rejected.

One problem is to find a suitable method for flow control which protects the node against being overloaded. This flow control must reliably cope with the following problem elements:

a small number of message channels have a high volume of traffic, which results in an overload situation;
a large number of message channels have a small amount of message traffic, producing an overload situation overall; and
no computation power should be consumed for flow control when a message channel is inactive, and little computation power should be consumed when a message channel has a small amount of message traffic;

One known solution to this problem is to define connection guidelines which restrict the number of message channels which can be connected to one node. This leads to a large amount of capacity being reserved in order to deal with overload situations which occur rarely.

A further known method solves the problem in two steps. In a first step, the window size is reduced to an estimated load which can be coped with, and fine adjustment is carried out in a second step, as a function of the overload indication. This can be used sensibly only for a small number of message channels with a known transmission power whose level is constantly high; in particular, this solution is not able to deal with inactive message channels without using computation power.

An object to which the present invention is directed, is to avoid the disadvantages of the previously known methods for flow control for a number of transmitters with an unknown and/or different transmission power.

SUMMARY OF THE INVENTION

Accordingly, one major aspect of the method of the present invention is the fact that the control process is based on a number of received messages, and is not based on fixed time intervals. This has the advantage that no measurements are carried out for inactive message channels, that is to say message channels on which no messages are being received, so that no computation capacity is associated with inactive message channels. Furthermore, message channels which continuously fully utilize their window are controlled more frequently than message channels whose transmission power is less than the window allocated to them. This results in the window size of those message channels which always completely utilize their window being continuously increased further during operation without overload, on the one hand, in order to take account of their transmission power. On the other hand, these message channels likewise are controlled more frequently in the event of overload, so that the node is more effectively protected against being overloaded.

According to one advantageous embodiment of the present invention, the proposed method is coupled to a method for setting the window size for I/O overload such that its capacity is adequate. As such, in the event of an overload, the window size can be set to an optimum value in one step while, in contrast, during operation without any overload, the window size can be enlarged for message channels whose window is fully utilized.

Additional features and advantages of the present invention are described in, and will be apparent from, the following Detailed Description of the Invention and the FIGS.

BRIEF DESCRIPTION OF THE FIGURES

FIG. 1 shows a flowchart of a method according to the teachings of the present invention.

DETAILED DESCRIPTION OF THE INVENTION

A node in a communication network to which message channels are connected and on which the SSCOP (Service Specific Connection Oriented Protocol) with SSCF UNI (Service Specific Coordination Function for the User-Network Interface) is used as a protector transmission protocol is considered as an exemplary embodiment. The window which is provided by the receiver for the traffic source is transmitted in a STAT message (status message) or a USTAT message (unsolicited status message) together with further status information to the traffic source. Status variables are maintained for each message channel. In this exemplary embodiment, the variable VR(H) is used, and is given the value of the highest sequence number of the received (not in sequence) messages. The variable $\Delta$VR(H) is introduced as the change to VR(H) since the last measurement.

If $\Delta$VR(H) reaches the current window size during an overload situation, the window is set to a reduced value. The new window size corresponds to the number of messages actually received during the measurement. The new window size is smaller than the previous size since messages are rejected in an overload situation; that is to say, $\Delta$VR(H) is greater than the number of messages received since the start of the measurement.

If no overload is present, the window is enlarged in steps of 10 percent each.

This necessarily means that no measurements are carried out for inactive message channels.

Although the present invention has been described with reference to specific embodiments, those of skill in the art will recognize that changes may be made thereto without departing from the spirit and scope of the present invention as set forth in the hereafter appended claims.

The invention claimed is:

1. A method for flow control for a plurality of transmitters with a transmission power which is at least one of unknown and different, the method being carried out in a receiving device in a communication system, the method comprising the steps of:

determining a number of messages which are received per message channel in the receiving device;

determining a new window size for each message channel as soon as the number of messages received per message channel exceeds a specific value, so as to influence the number of messages which a message source may send without acknowledgment;

storing a sequence number of a next message at a start of a control cycle:

monitoring sequence numbers of subsequent messages;

comparing a difference between the current sequence number and the sequence number at the start of the control cycle with the window size and using the difference to perform flow control.

2. A method for flow control as claimed in claim 1, the method further comprising the step of setting a new window size if the difference between the current sequence number and the sequence number at the start of the control cycle at least reaches the current window size multiplied by a parameter.

3. A method for flow control as claimed in claim 2, the method further comprising the step of choosing the parameter based on external influences which do not relate directly to the current window size.

4. A method for flow control as claimed in claim 3, the method further comprising the steps of:

carrying out an overload identification;

choosing, in an overload situation, a new window size which is smaller than the current window size; and choosing, if no overload exists, a new window size such which is larger than the current window size.

5. A method for flow control as claimed in claim 4, the method further comprising the steps of:

determining the new window size, in order to reduce the size of the window, from the number of messages passed on in an overload situation from the receiving device to an upstream processing device; and enlarging the window by enlarging the current window by a specific percentage.

6. A method for flow control as claimed in claim 1, wherein the control cycle is started at randomly selected times.

7. A system for flow control for a plurality of transmitters with a transmission power which is at least one of unknown and different, the system being part of a receiving device in a communications system, the system comprising:

parts for determining a number of messages received per message channel;

parts for determining a new window size for each message channel as soon as the number of messages received per message channel exceeds a specific value, wherein the system influences a number of messages which a message source may send without acknowledgment, wherein the system stores a sequence number of a next message at a start of a control cycle, monitors sequence numbers of subsequent messages, and compares a difference between the current sequence number and the sequence number at the start of the control signal with the window size and using the difference to perform flow control.

8. A system for flow control as claimed in claim 7, wherein the system sets a new window size if the difference between the current sequence number and the sequence number at the start of the control cycle at least reaches the current window size multiplied by a parameter.

9. A system for flow control as claimed in claim 8, wherein the system chooses the parameter based on external influences which do not relate directly to the current window size.

10. A system for flow control as claimed in claim 9, wherein the system carries out overload identification such that, in an overload situation, the system chooses a new window size which is smaller than the current window size and, if no overload exists, the system chooses a new window size which is larger than the current window size.

11. A system for flow control as claimed in claim 10, wherein, in order to reduce the size of the window, the system determines the new window size from the number of messages passed on in an overload situation from the receiving device to an upstream processing device; and the system enlarges the size of the window by enlarging the current window by a specific percentage.

12. A system for flow control as claimed in claim 8, wherein the system starts the control cycle at randomly chosen times.

13. A method for flow control for a plurality of transmitters with a transmission power which is at least one of unknown and different, the method being carried out in a receiving device in a communication system, the method comprising the steps of:

determining a number of messages which are received per message channel in the receiving device;

determining a new window size for each message channel as soon as the number of messages received per message channel exceeds a specific value, so as to influence the number of messages which a message source may send without acknowledgment, wherein the system starts a control cycle at randomly chosen times and determining the new window size to perform flow control.

* * * * *